US009414319B2

(12) United States Patent
Chen et al.

(10) Patent No.: US 9,414,319 B2
(45) Date of Patent: Aug. 9, 2016

(54) SOUNDING REFERENCE SIGNALS AND PROXIMITY DETECTION IN LTE

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 14/446,320

(22) Filed: Jul. 29, 2014

(65) Prior Publication Data

US 2015/0092699 A1 Apr. 2, 2015

Related U.S. Application Data

(60) Provisional application No. 61/886,030, filed on Oct. 2, 2013.

(51) Int. Cl.
*H04W 52/32* (2009.01)
*H04W 52/04* (2009.01)
*H04L 5/00* (2006.01)
*H04W 52/14* (2009.01)

(52) U.S. Cl.
CPC ............ *H04W 52/04* (2013.01); *H04L 5/0048* (2013.01); *H04W 52/325* (2013.01); *H04W 52/146* (2013.01)

(58) Field of Classification Search
None
See application file for complete search history.

(56) References Cited

U.S. PATENT DOCUMENTS

2010/0246494 A1* 9/2010 Sanayei ............... H04B 7/0417 370/328
2013/0012252 A1* 1/2013 Suzuki ................ H04W 52/325 455/509

(Continued)

FOREIGN PATENT DOCUMENTS

EP 2523510 A1 11/2012

OTHER PUBLICATIONS

3GPP Draft; R3-131830 Switchon Enhancements, 3RD Generation Partnership Project (3GPP), Qualcomm Incorporated et al., "Switch-on Solutions for Overlaid Scenario", Mobile Competence Centre; 650, Route Des Lucioles ; F-06921 Sophia-Antipolis Cedex; France Volume Ran WG3, no. Venice, Italy; Retrieved from the Internet: URL:http://www.3gpp.org/ftpjtsg ran/WG3 lu/TSGR3 81bis/ Docsj/, 20131007-20131011 Sep. 28, 2013, XP050720041, 3 pages. International Search Report and Written Opinion—PCT/US2014/ 058663—ISA/EPO—Dec. 11, 2014.

*Primary Examiner* — Mohammad Adhami
(74) *Attorney, Agent, or Firm* — Arent Fox LLP

(57) ABSTRACT

In an aspect of the disclosure, is directed to addressing UE proximity detection near non-serving base stations. Certain classes of base stations may activate and deactivate based on the presence of nearby UEs. In their deactivated state these base stations may employ no signaling or limited signaling. Networks employing such base stations may employ a discovery mechanism, as disclosed herein, to allow such base stations to detect or discover nearby UEs. In accordance with the disclosure, a UE may transmit the proximity SRS at a maximum power or another signal strength that can be determined by a listening base station. The listening base station may employ the signal to determine UE proximity and take appropriate steps, such as activating some aspects of its signaling, remaining inactive, or entering an alternative state of limited signaling or further UE detection.

31 Claims, 11 Drawing Sheets

(56) References Cited

U.S. PATENT DOCUMENTS

| | | | |
|---|---|---|---|
| 2013/0077571 A1* | 3/2013 | Papasakellariou | H04W 52/325 370/328 |
| 2013/0121279 A1 | 5/2013 | Noh et al. | |
| 2013/0195028 A1* | 8/2013 | Papathanassiou | H04L 5/1469 370/329 |
| 2014/0011468 A1* | 1/2014 | Park | H04B 7/0802 455/272 |
| 2014/0094162 A1* | 4/2014 | Heo | H04J 11/0086 455/422.1 |
| 2014/0362750 A1* | 12/2014 | Song | H04W 36/0072 370/311 |
| 2015/0237620 A1* | 8/2015 | Ouchi | H04W 72/0473 370/329 |

* cited by examiner

SOUNDING REFERENCE SIGNALS AND PROXIMITY DETECTION IN LTE

CROSS-REFERENCE TO RELATED APPLICATION(S)

This application claims the benefit of U.S. Provisional Application Ser. No. 61/886,030, entitled "SOUNDING REFERENCE SIGNALS AND PROXIMITY DETECTION IN LTE" and filed on Oct. 2, 2013, which is expressly incorporated by reference herein in its entirety.

BACKGROUND

1. Field

The present disclosure relates generally to communication systems, and more particularly, to sounding reference signals (SRS) and proximity detection in Long Term Evolution (LTE).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, is directed to addressing UE proximity detection near non-serving base stations. Certain classes of base stations may activate and deactivate based on the presence of nearby UEs. In their deactivated state these base stations may employ no signaling or limited signaling. Networks employing such base stations may employ a discovery mechanism, as disclosed herein, to allow such base stations to detect or discover nearby UEs. In accordance with the disclosure, a UE may receive a request to transmit proximity SRS with a predetermined transmit power from its serving base station (or via other mechanisms). The UE may transmit the proximity SRS at a maximum power or another signal strength that can be determined by a listening base station. The listening base station may employ the signal to determine UE proximity and take appropriate steps, such as activating some aspects of its signaling, remaining inactive, or entering an alternative state of limited signaling or further UE detection.

In an aspect of the disclosure, a method, a computer program product, and an apparatus are provided. The apparatus may be a user equipment (UE). The UE receives a request to transmit SRS with at least one predetermined transmit power. The UE transmits the SRS at the at least one predetermined transmit power based on the request. The at least one predetermined transmit power may be one predetermined transmit power at a maximum power. The UE may receive a configuration indicating the at least one predetermined transmit power from a node. The SRS may be received by a node for proximity detection between the UE and the node. The UE may receive a request to transmit a second SRS without a predetermined transmit power. The UE may transmit both the SRS and the second SRS, or may refrain from transmitting the second SRS.

While aspects of this disclosure refer situations employing base stations capable of activating and deactivating based on the transmitted SRS, the invention is not limited thereto and can be employed with any non-serving base station for UE proximity detection or other purposes.

DETAILED DESCRIPTION

Figure 1:
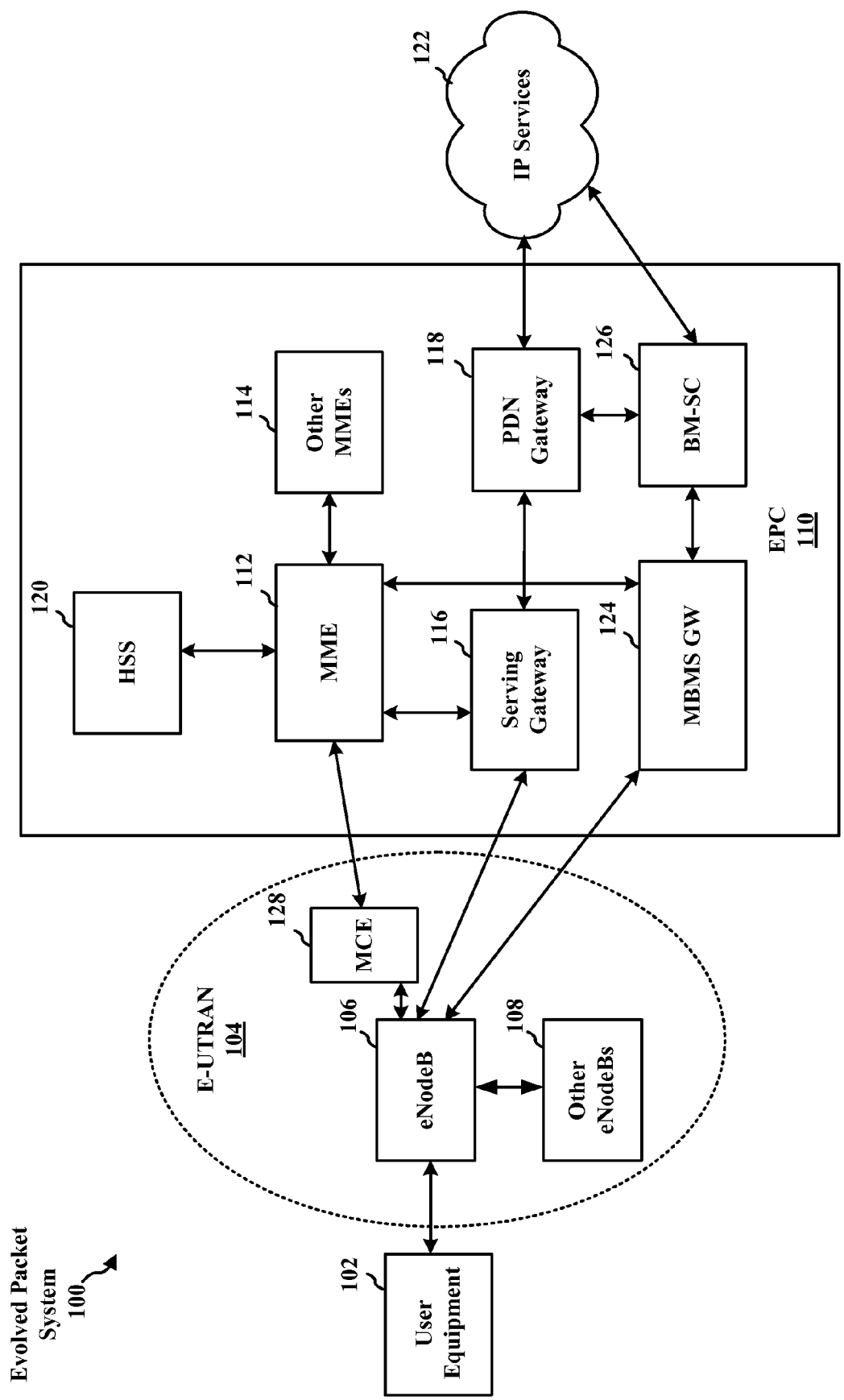
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
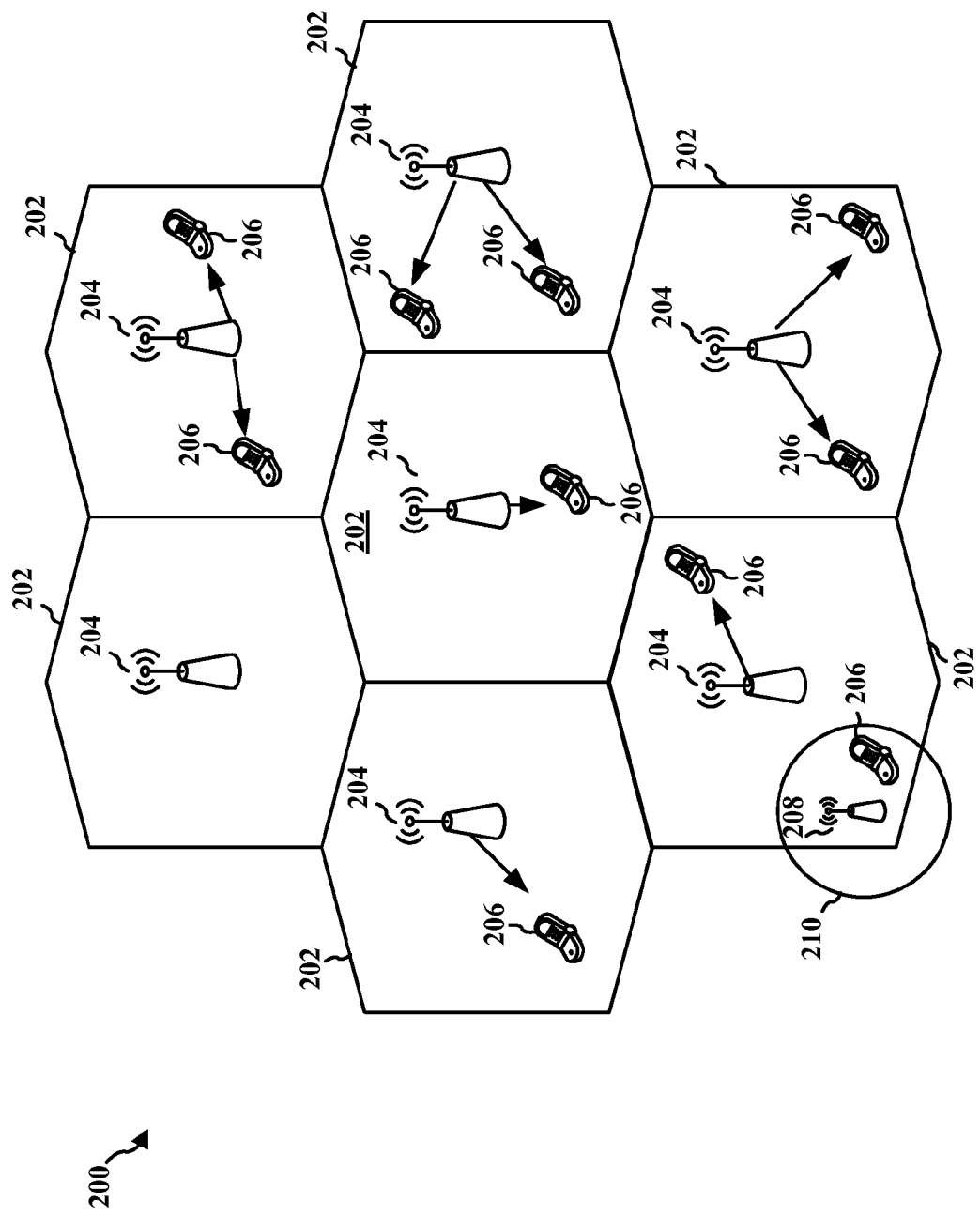
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
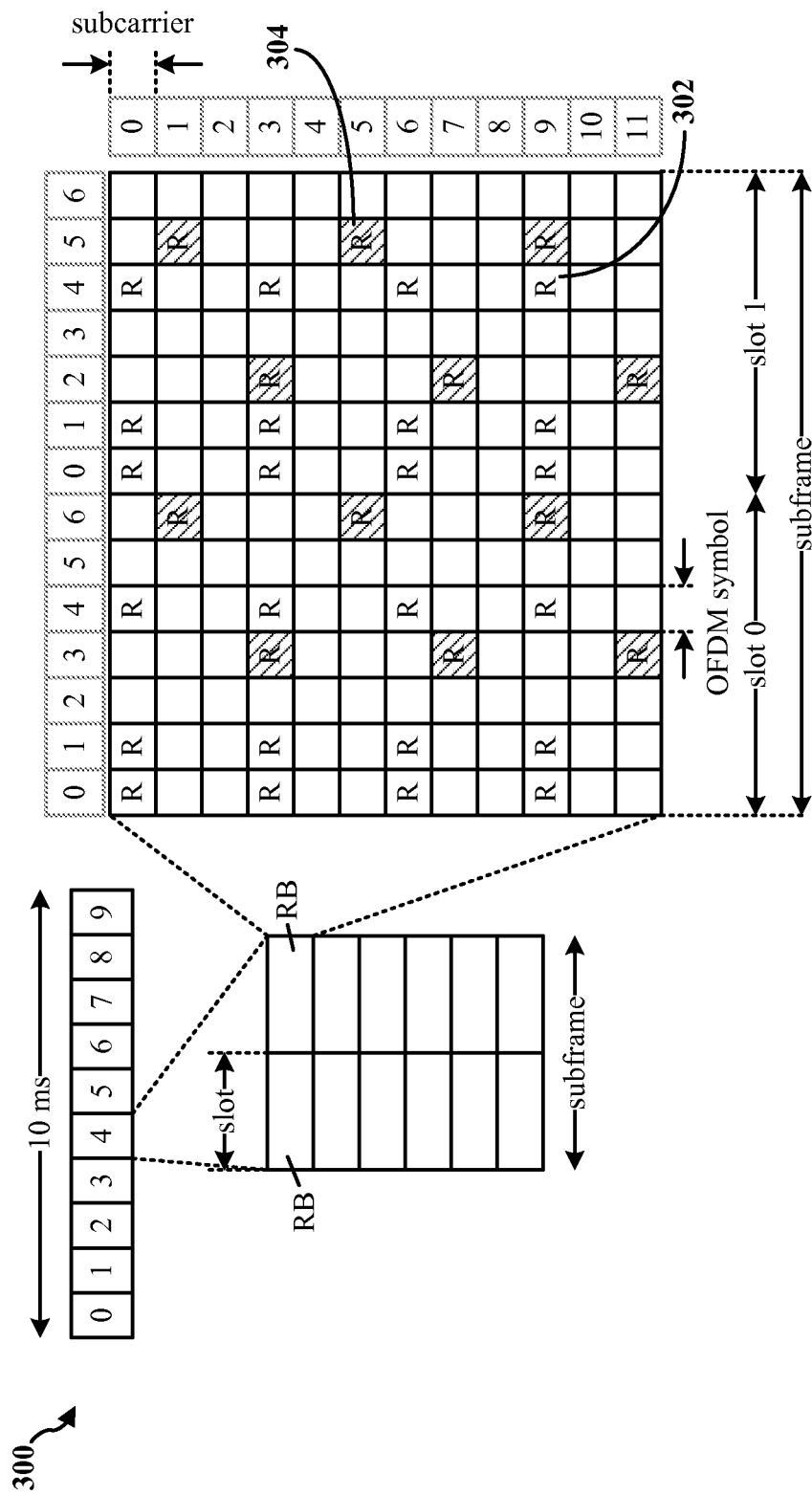
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
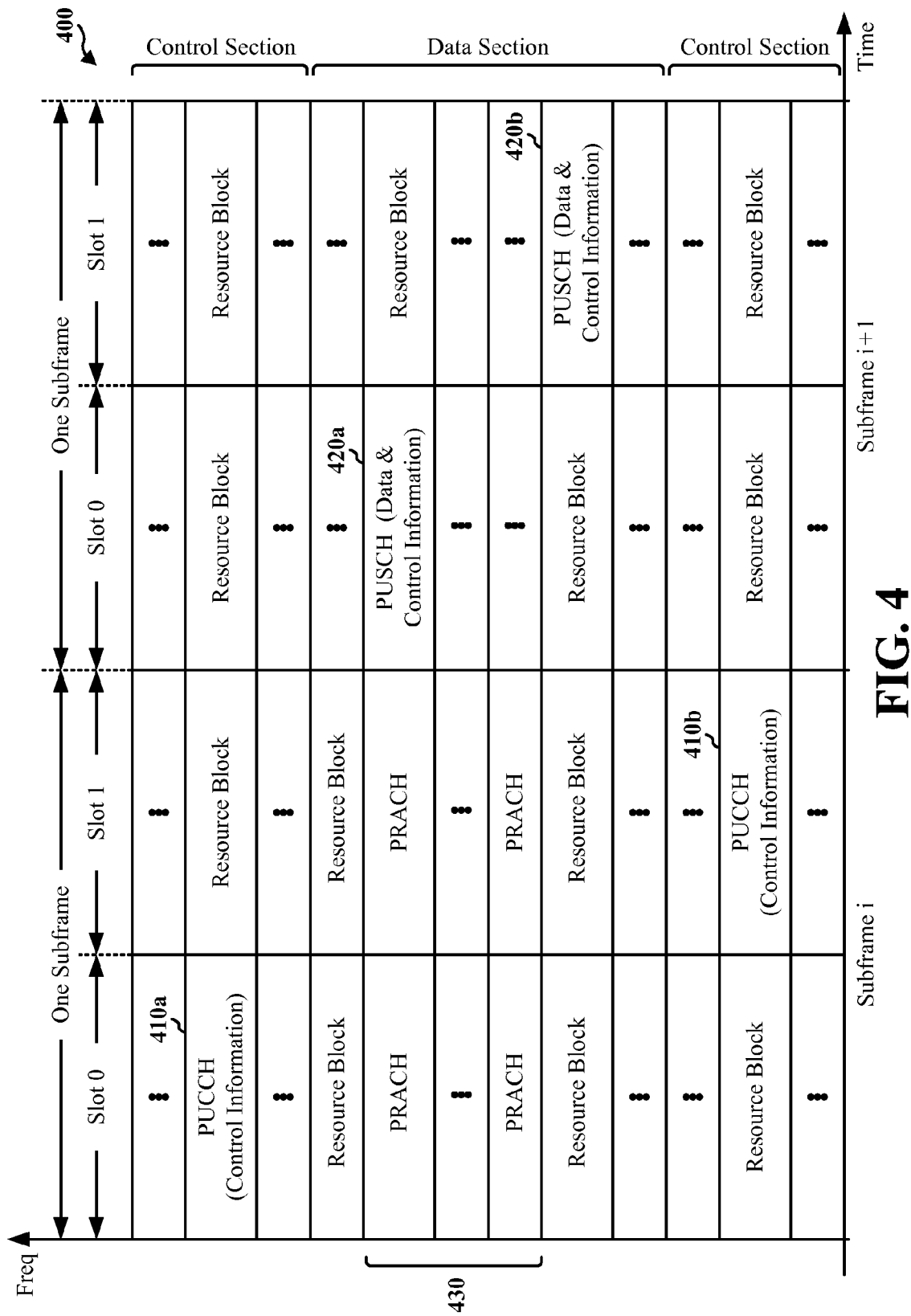
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
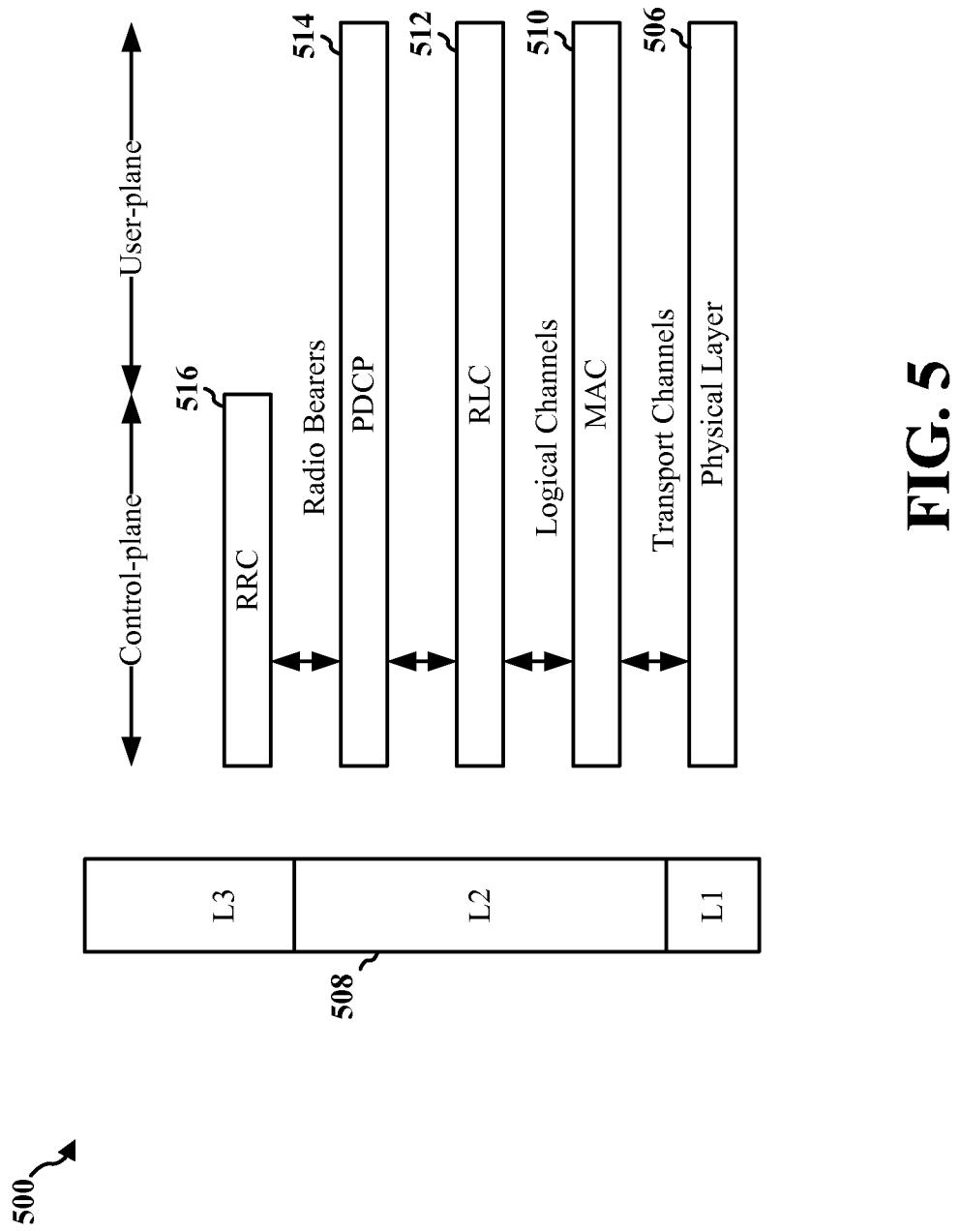
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
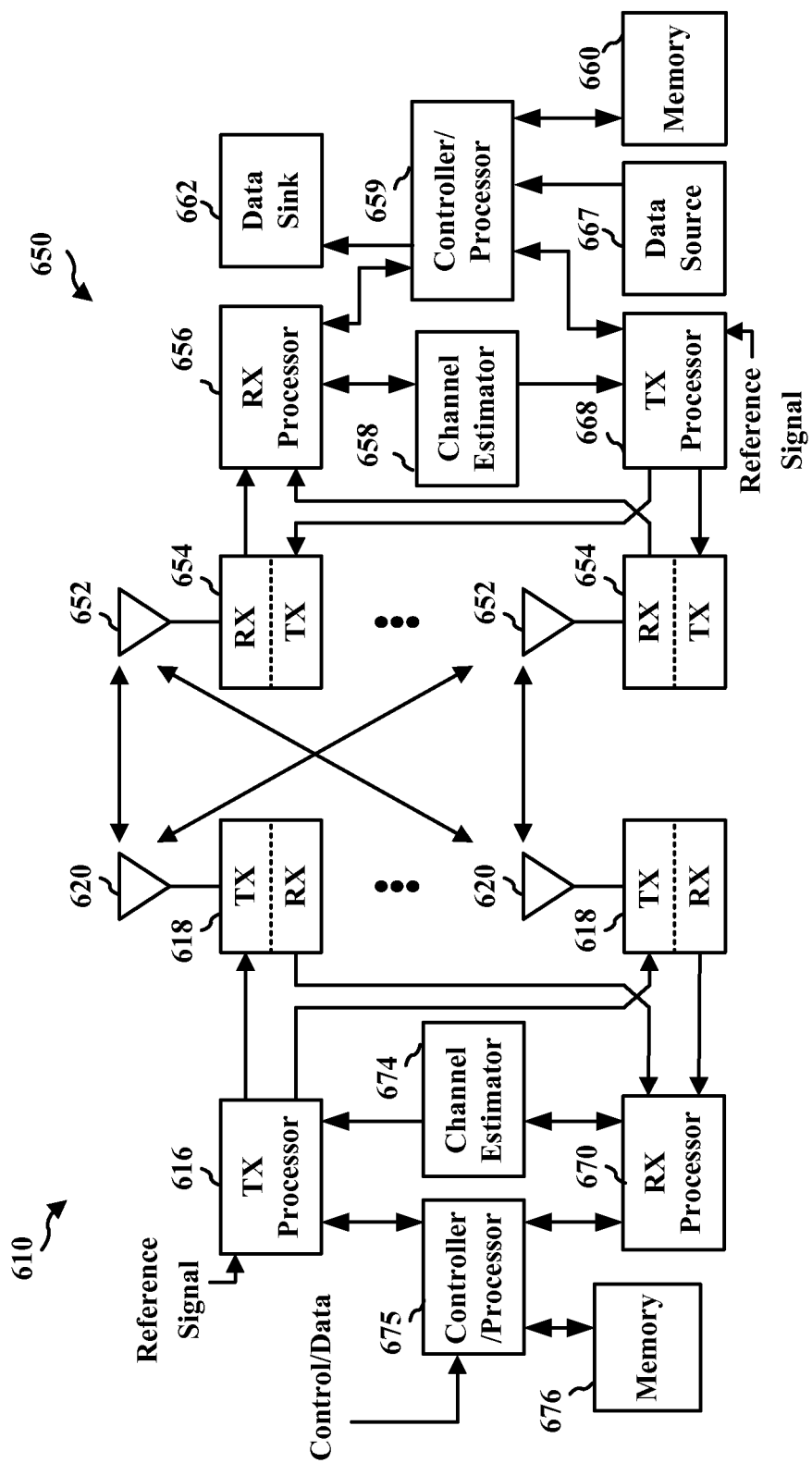
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
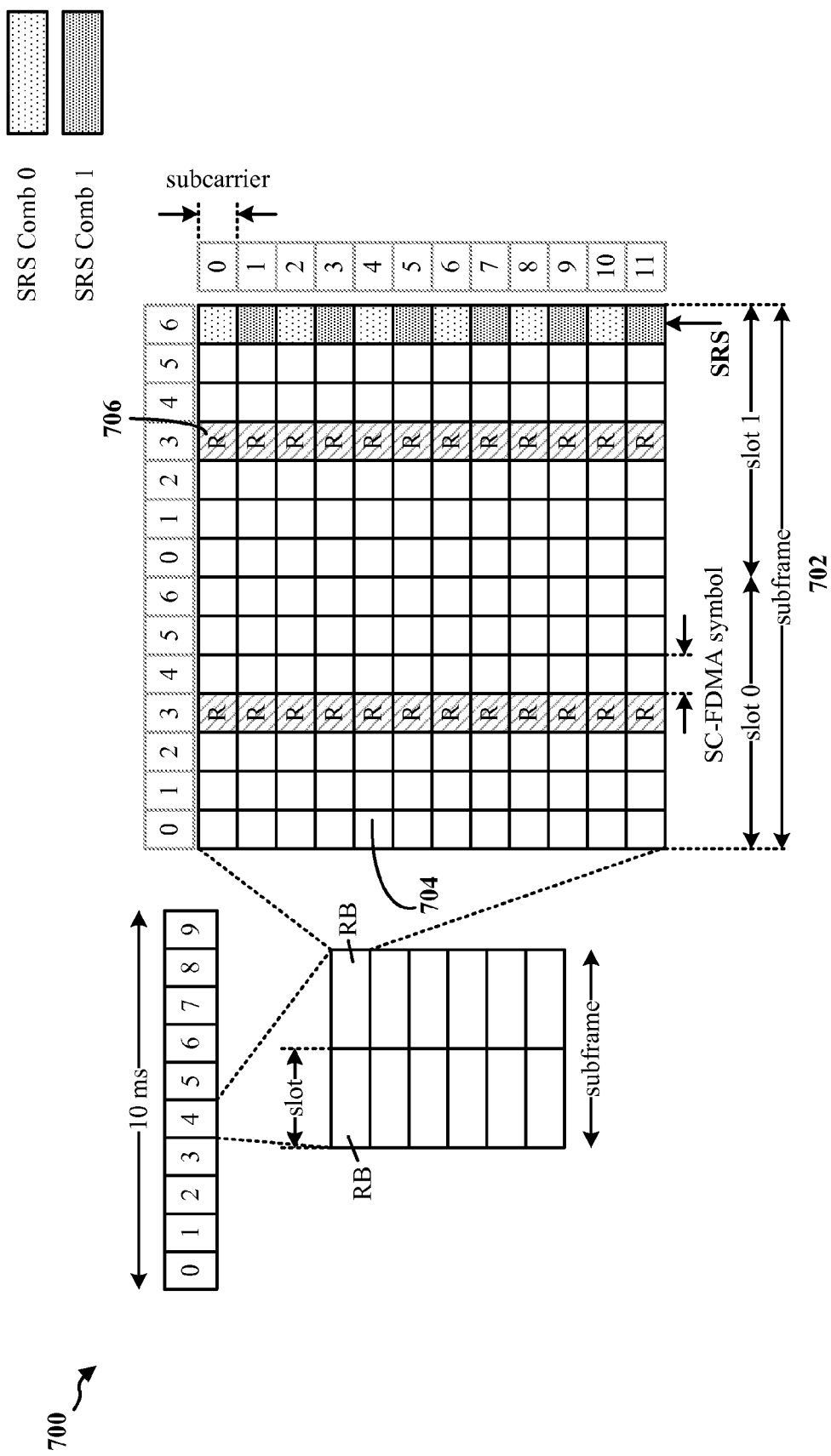
FIG. 7 is a second diagram illustrating an example of an UL frame structure in LTE.

FIG. 7 is a second diagram 700 illustrating an example of an UL frame structure in LTE. An UL frame (10 ms) may be divided into 10 equally sized subframes 702. Each subframe may include two consecutive time slots. A resource grid may be used to represent two time slots, each time slot including a resource block. The resource grid is divided into multiple resource elements. A resource block contains 12 consecutive subcarriers in the frequency domain and 7 consecutive SC-FDMA symbols in the time domain, or 84 resource elements. The resource elements 704 may include data and/or control information. The resource elements 706 may include reference/pilot signals. The resource elements 708 may include SRS. The SRS may be transmitted in the last SC-FDMA symbol of the resource block in slot 1 of a subframe. SRS are primarily used by a serving eNB for channel quality estimation to enable frequency-selective scheduling on the UL. Such SRS are subject to power control by the UE. Accordingly, the serving eNB may not know the power at which the SRS are transmitted by the UE. To support the frequency-selective scheduling between multiple UEs, the SRS from different UEs may overlap. Accordingly, the last SC-FDMA symbol of the resource block in slot 1 of a subframe may be split into a comb structure, with one or more UEs assigned to transmit SRS in comb 0 and one or more other UEs assigned to transmit SRS in comb 1. Although not shown, there are other possibilities of SRS transmissions. As an example, SRS may be based on the resource elements 706, where a cyclic shift and/or an orthogonal cover code (OCC) different from the one for PUSCH transmission may be used with the reference/pilot signals for the purpose of sounding uplink channels.

In exemplary methods, a UE may be configured to transmit SRS with a fixed/predetermined transmit power to enable proximity detection by another node, such as an eNB and/or another UE. Configuring a UE to transmit SRS with a fixed/predetermined transmit power allows a node to be able to determine a proximity of the UE to the node by determining a difference in a received power and the fixed/predetermined transmission power. Proximity detection can facilitate energy savings at a small cell eNB by allowing the eNB to utilize a low-power mode, to turn off completely, to reduce transmit power, to reduce a transmit signal duty cycle, or to implement other changes for reducing power when there are no UEs or just a few UEs within coverage of the eNB. Exemplary methods in relation to SRS and proximity detection are provided infra.

Figure 8:
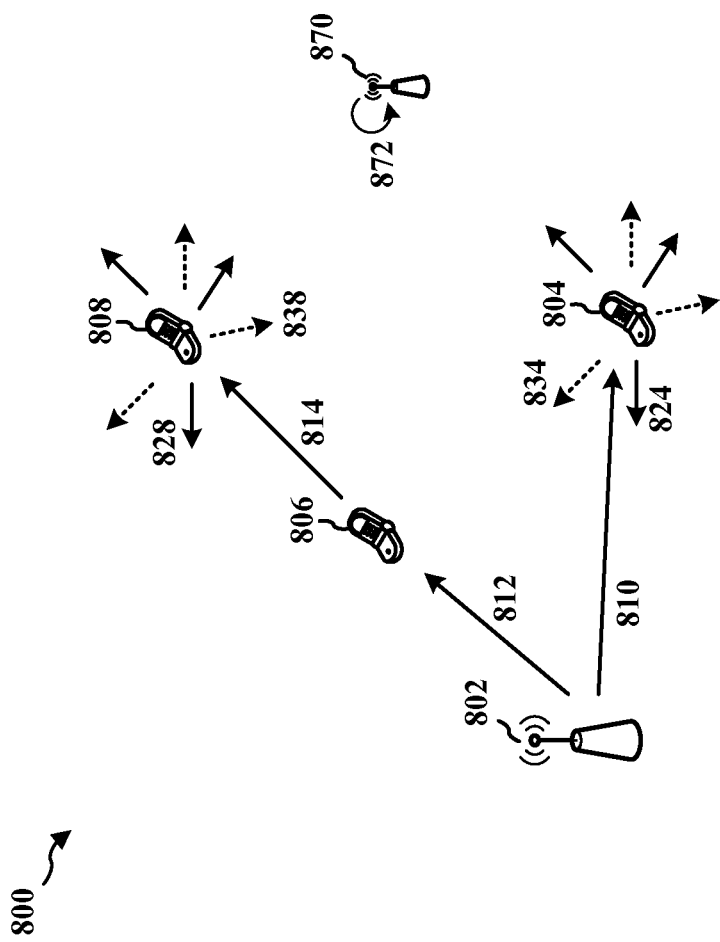
FIG. 8 is a diagram for illustrating an exemplary method in relation to SRS and proximity detection.

FIG. 8 is a diagram 800 for illustrating exemplary methods in relation to SRS and proximity detection. As shown in FIG. 8, a UE 804 receives a request 810 from an eNB 802 to transmit SRS with at least one fixed/predetermined transmit power. The UE 804 subsequently transmits the SRS 824 at the at least one fixed/predetermined transmit power based on the request. A small cell eNB 870 may determine a proximity to the UE 804 based on the received SRS 824. The small cell eNB 870 may control 872 a power (e.g., utilize a low-power mode, turn off completely, reduce transmit power, reduce a transmit signal duty cycle, or implement other changes for reducing power) based on the determined proximity and determined proximities to other UEs. The UE 804 may also transmit a second SRS 834 without a fixed/predetermined transmit power. The power at which the second SRS 834 is transmitted may based on information received indicating a receive power at which the second SRS should be received by a node/eNB. The UE 804 determines the power for transmitting the second SRS based on the received power information, and therefore the second SRS 834 is subject to power control at the UE 804. The eNB 802 may determine a frequency-selective UL scheduling that is good for the UE 804 based on the received second SRS 834. Further, as shown in FIG. 8, a UE 808 receives a request 814 from a UE 806 to transmit SRS with at least one fixed/predetermined transmit power. The UE 808 subsequently transmits the SRS 828 at the at least one fixed/predetermined transmit power based on the request. The small cell eNB 870 may determine a proximity to the UE 808 based on the received SRS 828. The small cell eNB 870 may control 872 a power based on the determined proximity and determined proximities to other UEs. The UE 808 may also transmit a second SRS 838 without a fixed/predetermined transmit power (or with a transmit power that is based on a particular receive power). The UE 806 may generate the request 814 itself, or may relay a request 812 received from the eNB 802. The SRS may be referred to as proximity SRS, fixed-power SRS, or predetermined-transmit-power SRS. The second SRS may be referred to as regular SRS, non-fixed-power SRS, or non-predetermined-transmit-power SRS.

Referring again to the request 810. In one configuration, the request 810 may be to transmit SRS with a fixed/predetermined offset relative to a known transmit power (e.g., a maximum transmit power or other known transmit power value). In such a configuration, the UE 804 may receive information indicating an offset transmit power at which the SRS is transmitted. This offset may be relative to the maximum UE transmit power or some other known transmit power value known to the UE and node. The UE 804 may then apply the offset to determine the transmit power to obtain an adjusted transmit power, and may transmit the SRS 824, 828 at the adjusted transmit power.

UEs may be triggered to transmit periodic SRS or aperiodic SRS. The at least one fixed/predetermined transmit power may be one fixed/predetermined transmit power, such as a maximum power, or multiple different powers at which SRS should be transmitted. UEs may be concurrently configured to transmit both fixed-power/proximity SRS and non-fixed-power/regular SRS. When transmitting SRS, UEs may need to determine the type of SRS being transmitted in order to control properly the power of the SRS transmission. For example, when UEs transmit fixed-power/proximity SRS, UEs use a fixed/predetermined transmit power for the SRS transmission. However, when UEs transmit non-fixed-power/ regular SRS, the SRS transmission is subject to power control at the UE. Specifically, for regular SRS, a UE may receive information indicating a receive power at which the SRS should be received by an eNB, and the UE may adjust the transmit power of the SRS so that the SRS is received by the eNB at the requested receive power. UEs may receive a configuration indicating the at least one fixed/predetermined transmit power from a node (e.g., the eNB 802, the UE 806). Alternatively, UEs may have a static configuration (or a predetermined configuration) of the at least one fixed/predetermined transmit power at which the fixed-power/proximity SRS should be transmitted.

One or more of the SRS parameters for the fixed-power/proximity SRS may be fixed (static or predetermined) or configured. That is, one or more of the SRS parameters including a frequency hop size, a bandwidth, a comb, or a cyclic shift of the SRS may be predetermined for a UE or the UE may receive a configuration for the SRS parameters. The configuration may be received through RRC signaling or dynamically indicated, such as through a downlink control information (DCI) message. The SRS parameters may further include an SRS transmission period and an SRS subframe offset. The SRS transmission period is the periodicity at which the SRS are transmitted, and the SRS subframe offset indicates the subframe in which the SRS are transmitted within the SRS transmission period. The SRS bandwidth is the number of resource blocks assigned to a UE. The SRS bandwidth may be an even number of resource blocks. Multiple cyclic time shifts (e.g., 8) may be supported for each comb, thus allowing simultaneous SRS transmissions from multiple UEs using the same resource blocks and comb within the resource blocks. UEs may transmit fixed-power/proximity SRS with a 1-port transmission.

The requests 810, 814 for fixed-power/proximity SRS may be for periodic SRS. UEs may be configured with a separate SRS process for proximity detection in which SRS are transmitted at a fixed/predetermined transmit power. That is, UEs may be configured with a first process for transmitting fixed-power/proximity SRS and a second process for transmitting non-fixed-power/regular SRS. The fixed/predetermined SRS transmission power can be predetermined or configurable. A UE may receive a particular configuration for the SRS transmit power and transmit the SRS based on the configuration. Alternatively, a UE may use a predetermined SRS transmission power known by a wireless device (UE and/or eNB) that is determining the proximity of the UE. The transmission power may vary each SRS transmission opportunity. For example, assume a UE transmits fixed-power/proximity SRS every 10 subframes and that the UE transmits the fixed-power/proximity SRS with the fixed/predetermined powers $P_1, P_2, P_3$, and $P_4$ (in that order). The UE may then transmit the SRS in frames $4n+m$ ($0 \le m \le 3$) with power $P_1$, frames $4n+m+1$ with power $P_2$, frames $4n+m+2$ with power $P_3$, and frames $4n+m+3$ with power $P_4$. When the processes for the different SRS overlap, the fixed-power/proximity SRS may take precedence over the non-fixed-power/regular SRS. For example, when a UE receives requests to transmit fixed-power/proximity SRS and non-fixed-power/regular SRS, the UE may determine whether the transmission of the non-fixed-power/regular SRS would occupy the same subframe on the same carrier as the transmission of the fixed-power/proximity SRS. If the UE determines that the non-fixed-power/regular SRS would occupy the same subframe on the same carrier as the transmission of the fixed-power/proximity SRS, the UE may refrain from transmitting the non-fixed-power/regular SRS in the subframe in order to transmit the fixed-power/proximity SRS. Once configured to transmit fixed-power/proximity SRS, a UE may continue to transmit the fixed-power/proximity SRS until the UE receives another request indicating to stop transmitting the fixed-power/proximity SRS. Once configured to transmit the fixed-power/proximity SRS, a UE may receive additional requests that modify one or more SRS parameters (e.g., frequency hop size, bandwidth, comb, cyclic shift, SRS transmission period, SRS transmission period, SRS subframe offset, or other SRS related parameters) that the UE uses to transmit the fixed-power/proximity SRS.

The requests 810, 814 for fixed-power/proximity SRS may be for aperiodic SRS. UEs may receive requests for aperiodic SRS transmissions through a control channel. UEs may receive requests for aperiodic SRS transmissions through a physical downlink control channel (PDCCH) or an enhanced PDCCH (EPDCCH). Specifically, the requests may be received through a DCI format 0 message (or other DCI formats, e.g., DCI formats 4, 2B, 2C or 2D) or a PDCCH order in a DCI format 1A message. Special sequences, reuse of existing sequences, or new bits in the DCI messages may be used to trigger the aperiodic SRS transmissions. For example, in a DCI format 0 message, aperiodic SRS transmissions may be triggered if the resource allocation field is set to all "1"s and an aperiodic SRS flag is set. For another example, a PDCCH order in a DCI format 1A message may indicate to a UE to transmit aperiodic SRS. The fixed/predetermined SRS transmission power can be predetermined or dynamically allocated. The aperiodic fixed-power/proximity SRS can be one-shot or multiple-shot SRS. The number of times that a UE transmits fixed-power/proximity SRS may be predetermined or configured. For example, UEs may be configured with the same fixed/predetermined transmit power P for each SRS transmission or the fixed/predetermined transmit powers $P_1, P_2, \ldots, P_n$ for n-shot SRS. UEs may transmit fixed-power/proximity SRS with an increasing ramped fixed/predetermined transmit power in each individual transmission of the SRS. For example, a UE may transmit SRS in a first subframe at 9 dB below a maximum power, SRS in a second subframe at 6 dB below a maximum power, SRS in a third subframe at 3 dB below a maximum power, and SRS in a fourth subframe at a maximum power.

UEs may transmit SRS with a UE-specific sequence that is unique to the UE. The UE-specific sequence may be based on a UE ID (e.g., a cell radio network temporary identifier (C-RNTI)) so that a wireless device receiving the fixed-power/proximity SRS can detect the UE faster. Without a UE-specific sequence, the wireless device may use other means to determine the UE from which fixed-power/proximity SRS was received. In another configuration, UEs may transmit SRS with a group-specific sequence that is unique to a group of UEs. Wireless devices that receive the fixed-power/proximity SRS may then determine a set of UEs associated with the received fixed-power/proximity SRS, and may use other means to determine the UE in the set of UEs from which the fixed-power/proximity SRS was received. In yet another configuration, UEs may be configured/assigned with different sequences of SRS transmission powers. The assigned sequences may be unique to a UE or to a set of UEs. Wireless devices that receive the fixed-power/proximity SRS may average the power of the received SRS transmissions over time to determine the power sequence used for transmitting the fixed-power/proximity SRS. If the assigned sequence is unique to a UE, wireless devices may then determine the UE from which the fixed-power/proximity SRS was received by comparing the determined power sequence to the assigned power sequences. If the assigned sequence is unique to a set of UEs, wireless devices may then determine the set of UEs, and may use other means to determine the UE in the set of UEs from which the fixed-power/proximity SRS was received.

Due to a fixed/predetermined (and typically large) transmission power for fixed-power/proximity SRS, wireless devices that received the fixed-power/proximity SRS for proximity detection need to manage the SRS interference among the different UEs. Such wireless devices can use time division multiplexing (TDM), frequency division multiplexing (FDM), or a combination thereof, while trying to avoid using code division multiplexing (CDM). UEs may use TDM to transmit fixed-power/proximity SRS and non-fixed-power/regular SRS in different subframes. Specifically, a UE may transmit fixed-power/proximity SRS in a first subset of subframes of a set of subframes and non-fixed-power/regular SRS in a second subset of subframes of the set of subframes. The first subset of subframes is different than the second subset of subframes (i.e., no overlap in any of the subframes in the first and second subsets of subframes). UEs may use FDM to transmit fixed-power/proximity SRS in different resource blocks and/or different combs of the same resource blocks. With respect to the use of FDM to transmit fixed-power/proximity SRS in different combs, a UE may transmit fixed-power/proximity SRS in a first comb of an SC-FDMA symbol within a set of resource blocks and non-fixed-power/regular SRS in a second comb of the SC-FDMA symbol within the set of resource blocks. For example, UEs may be configured to transmit fixed-power/proximity SRS in one of comb 0 or 1 within a set of resource blocks and to transmit non-fixed-power/regular SRS in the other of comb 0 or 1 within the set of resource blocks. With respect to the use of FDM to transmit fixed-power/proximity SRS in different resource blocks, a UE may transmit fixed-power/proximity SRS in an SC-FDMA symbol within a first set of resource blocks and non-fixed-power/regular SRS in the SC-FDMA symbol within a second set of resource blocks different than the first set of resource blocks (i.e., the first and second sets of resource blocks have no resource blocks in common).

Figure 9:
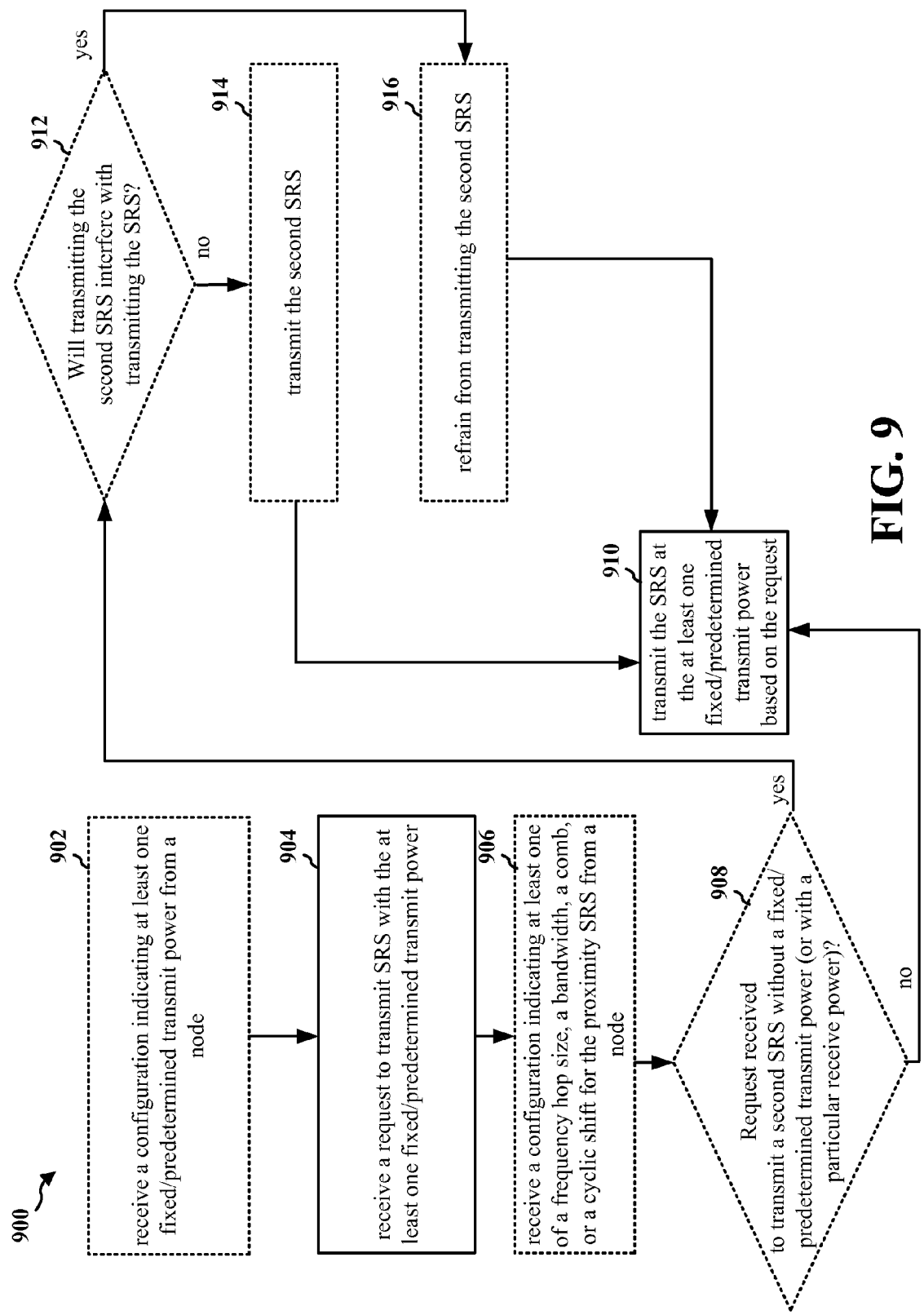
FIG. 9 is a flow chart of a method of wireless communication.

FIG. 9 is a flow chart 900 of a method of wireless communication. The method may be performed by a UE. In step 902, a UE may receive a configuration indicating at least one fixed/predetermined transmit power from a node (e.g., an eNB and/or another UE). In step 904, the UE receives a request to transmit SRS with the at least one fixed/predetermined transmit power. The at least one fixed/predetermined transmit power for the SRS transmissions may be one fixed/predetermined transmit power or a set of fixed/predetermined transmit powers. In one configuration, the request may further include a power offset. In step 906, the UE may receive an SRS configuration indicating at least one of a frequency hop size, a bandwidth, a comb, or a cyclic shift for the SRS from a node. Alternatively, the SRS configuration including at least one of a frequency hop size, a bandwidth, a comb, or a cyclic shift of the SRS may be predetermined and fixed. In step 908, the UE may determine whether the UE received a request to transmit a second SRS without a fixed/predetermined transmit power (i.e., the request may be for transmitting the second SRS with a particular receive power, the second SRS is subject to power control at the UE). If the UE did not receive a request to transmit a second SRS without a fixed/predetermined transmit power (or with a transmit power that is based on a particular receive power) in step 908, then in step 910, the UE transmits the SRS at the at least one fixed/predetermined transmit power based on the request received in step 904. If the UE received a power offset with the request to transmit the SRS, the UE may determine the at least one fixed/predetermined transmit power based on the power offset and at least one of a maximum transmit power or a transmit power known to both the UE and a node. In step 910, the transmission of the SRS may be further based on a received (step 906), predetermined, or fixed SRS configuration. The SRS transmitted in step 910 may be received by a node for proximity detection between the UE and the node. The at least one fixed/predetermined transmit power may be one fixed/predetermined transmit power at a maximum power. Alternatively, the at least one fixed/predetermined transmit power may be a set of fixed/predetermined transmit powers including a plurality of fixed/predetermined transmit powers. If the UE received a request to transmit a second SRS without a fixed/predetermined transmit power (or with a transmit power that is based on a particular receive power) in step 908, then in step 912, the UE determines whether transmitting the second SRS would interfere with transmitting the SRS. If transmitting the second SRS would not interfere with transmitting the SRS, then in step 914, the UE transmits the second SRS. However, if transmitting the second SRS would interfere with transmitting the SRS, then in step 916, the UE refrains from transmitting the second SRS. Following steps 914 and 916, in step 910, the UE transmits the SRS at the at least one fixed/predetermined transmit power based on the request in step 904. The transmission of the SRS may be further based on a received, predetermined, or fixed SRS configuration. While step 910 is illustrated after step 914, step 910 may occur before step 914 or concurrently with step 914.

In step 912, the UE may determine whether the transmission of the second SRS would occupy the same subframe on the same carrier as the transmission of the SRS with the at least one fixed/predetermined transmit power. If in step 912 the UE determines that the transmission of the second SRS would not occupy the same subframe on the same carrier as the transmission of the SRS with the at least one fixed/predetermined transmit power, in step 914, the UE transmits the second SRS. However, if in step 912 the UE determines that the transmission of the second SRS would occupy the same subframe on the same carrier as the transmission of the SRS with the at least one fixed/predetermined transmit power, in step 916, the UE refrains from transmitting the second SRS in the subframe in order not to interfere with the SRS transmission with the at least one fixed/predetermined transmit power.

In step 902, the request may be for a periodic SRS transmission. When the request is for a periodic SRS transmission, in step 910, the UE transmits the SRS at the at least one fixed/predetermined transmit power periodically based on the request for the periodic SRS transmission. In step 902, the request may be for an aperiodic SRS transmission through a control channel. When the request is for an aperiodic SRS transmission, in step 910, the UE transmits the SRS at the at least one fixed/predetermined transmit power based on the request for the aperiodic SRS transmission in the control channel. The control channel may be a PDCCH or an EPDCCH. The SRS may be transmitted one time or a plurality of times. The number of times that the SRS are transmitted may be based on a configuration or may be predetermined. The UE may transmit the SRS until the UE receives a second request. The second request may deactivate the SRS or may modify at least one SRS parameter associated with the SRS. The control channel may be associated with a DCI format 0 message or a PDCCH order in a DCI format 1A message. The SRS may be transmitted with an increasing ramped fixed/predetermined transmit power of the at least one fixed/predetermined transmit power in each individual transmission of the SRS.

In a first configuration, in steps 910, 914, when the UE determines to transmit both the SRS and the second SRS, the UE may reduce potential interference between the SRS and the second SRS by transmitting the SRS with the at least one fixed/predetermined transmit power in a first subset of subframes of a set of subframes and transmitting the second SRS in a second subset of subframes of the set of subframes, where the first subset of subframes is different than the second subset of subframes (i.e., no subframes in common between the first and second subset of subframes). In the first configuration, the transmission of the SRS and the second SRS is non-concurrent. In a second configuration, in steps 910, 914, when the UE determines to transmit both the SRS and the second SRS, the UE may reduce potential interference between the SRS and the second SRS by transmitting the SRS with the at least one fixed/predetermined transmit power in a first comb of an SC-FDMA symbol within a set of resource blocks and transmitting the second SRS in a second comb of the SC-FDMA symbol within the set of resource blocks. The first and second combs within the same SC-FDMA symbol are different. In the second configuration, the transmission of the SRS and the second SRS is concurrent. In a third configuration, in steps 910, 914, when the UE determines to transmit both the SRS and the second SRS, the UE may reduce potential interference between the SRS and the second SRS by transmitting the SRS with the at least one fixed/predetermined transmit power in an SC-FDMA symbol within a first set of resource blocks and transmitting the second SRS in the SC-FDMA symbol within a second set of resource blocks different than the first set of resource blocks (i.e., no resource blocks are in common between the first and second sets of resource blocks). In the third configuration, the transmission of the SRS and the second SRS is concurrent. The SRS may be transmitted with a UE-specific sequence unique to the UE. The UE may be associated with a group and the SRS may be transmitted with a group-specific sequence unique to the group. The UE may be assigned a particular power sequence known by a node for transmitting the SRS. The particular power sequence may be associated just with the UE or to a group of UEs including the UE.

Figure 10:
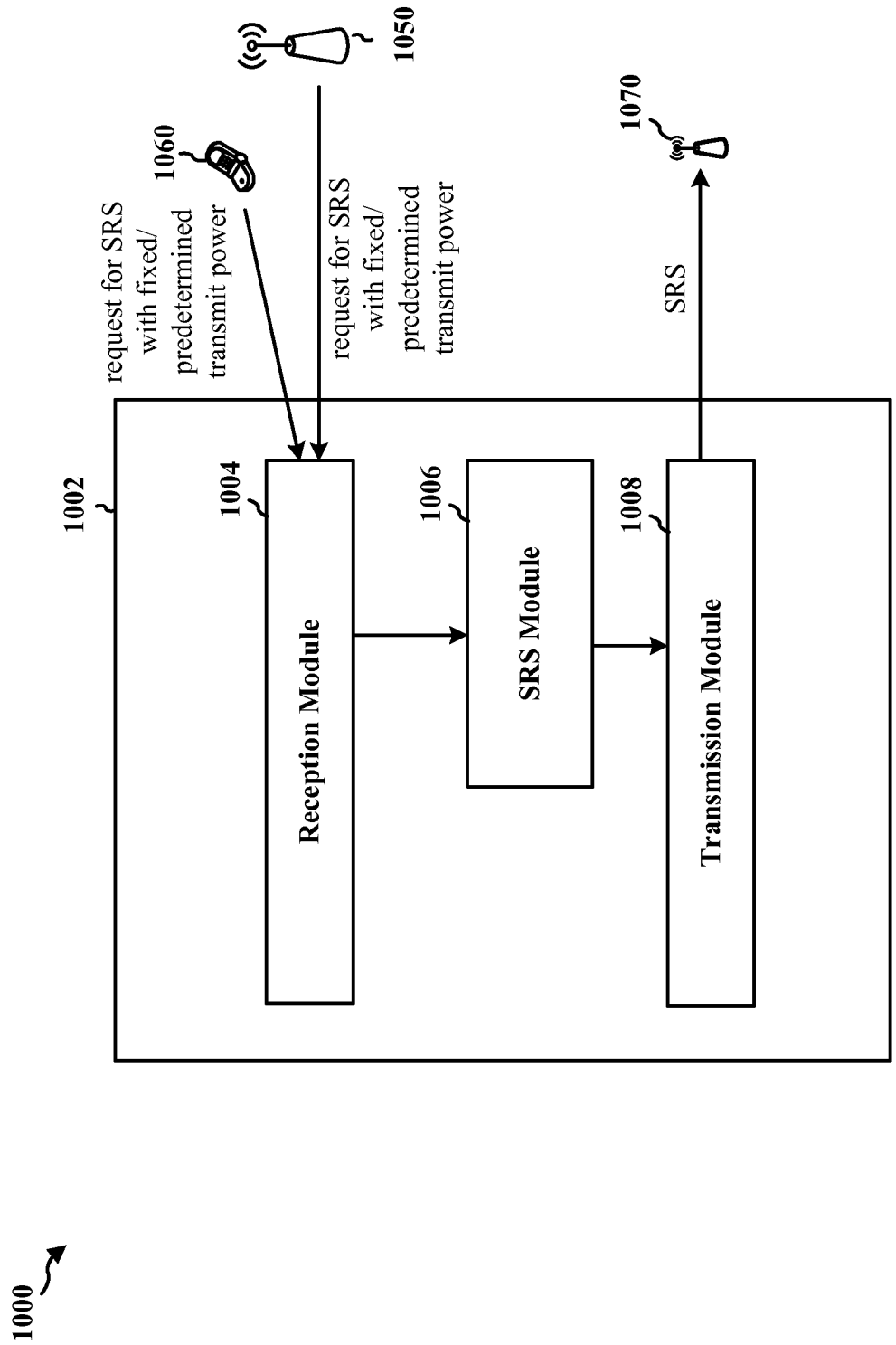
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus 1002 may be a UE. The UE includes a reception module 1004 that is configured to receive a request to transmit SRS with at least one fixed/predetermined transmit power. The UE may receive the request from an eNB 1050 or from a UE 1060. The UE 1060 may be operating as a relay. The UE further includes an SRS module 1006 that is configured to communicate with the receive module 1004 and to process the request. The UE further includes a transmission module 1008 that communicates with the SRS module 1006. The transmission module 1008 is configured to transmit the SRS at the at least one fixed/predetermined transmit power based on the request. The at least one fixed/predetermined transmit power may be one fixed/predetermined transmit power at a maximum power. The reception module 1004 may be configured to receive a configuration indicating the at least one fixed/predetermined transmit power from a node. The reception module 1004 may be configured to provide the received configuration to the SRS module 1006. The SRS may be received by a node (the small cell eNB 1070) for proximity detection between the UE and the node. An SRS configuration including at least one of a frequency hop size, a bandwidth, a comb, or a cyclic shift of the SRS may be fixed or predetermined. Alternatively, the reception module 1004 may be configured to receive an SRS configuration indicating at least one of a frequency hop size, a bandwidth, a comb, or a cyclic shift for the SRS from a node. The reception module 1004 may be configured to provide the received configuration to the SRS module 1006. The request may be for a periodic SRS transmission. In such a configuration, the SRS may be transmitted at the at least one fixed/predetermined transmit power periodically based on the request for the periodic SRS transmission. The reception module 1004 may be configured to receive a request to transmit a second SRS without a fixed/predetermined transmit power (or with a transmit power that is based on a particular receive power). The SRS module 1006 may be configured to determine that the transmission of the second SRS would occupy the same subframe on the same carrier as the transmission of the SRS with the at least one fixed/predetermined transmit power. The SRS module 1006 and/or the transmission module 1008 may be configured to refrain from transmitting the second SRS in the subframe in order to transmit the SRS with the at least one fixed/predetermined transmit power. If the SRS module 1006 is configured to refrain from transmitting the second SRS, the SRS module 1006 may refrain from instructing the transmission module 1008 to transmit the second SRS, or may inform the transmission module 1008 to skip that particular transmission of the second SRS.

The request may be for an aperiodic SRS transmission through a control channel. The SRS may be transmitted at the at least one fixed/predetermined transmit power based on the request for the aperiodic SRS transmission in the control channel. The control channel may be a PDCCH or an EPDCCH. The SRS may be transmitted once. The SRS may be transmitted a number of times. The number of times may be greater than or equal to two. The number of times that the SRS are transmitted may be based on a configuration. The SRS may be transmitted until the UE receives a second request. The second request may deactivate the SRS or may modify at least one parameter associated with the SRS. The control channel may be associated with one of a DCI format 0 message or a PDCCH order in a DCI format 1A message. The SRS may be transmitted with an increasing ramped fixed/predetermined transmit power of the at least one fixed/predetermined transmit power in each individual transmission of the SRS. The transmission module 1008 may be configured to transmit a second SRS. In one configuration, the SRS with the at least one fixed/predetermined transmit power is transmitted in a first subset of subframes of a set of subframes and the second SRS are transmitted in a second subset of subframes of the set of subframes. The first subset of subframes is different than the second subset of subframes. In one configuration, the SRS with the at least one fixed/predetermined transmit power are transmitted in a first comb of an SC-FDMA symbol within a set of resource blocks and the second SRS are transmitted in a second comb of the SC-FDMA symbol within the set of resource blocks. In one configuration, the SRS with the at least one fixed/predetermined transmit power are transmitted in an SC-FDMA symbol within a first set of resource blocks and the second SRS are transmitted in the SC-FDMA symbol within a second set of resource blocks different than the first set of resource blocks. The SRS may be transmitted with a UE-specific sequence unique to the UE. The UE may be associated with a group and the SRS may be transmitted with a group-specific sequence unique to the group.

The apparatus may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
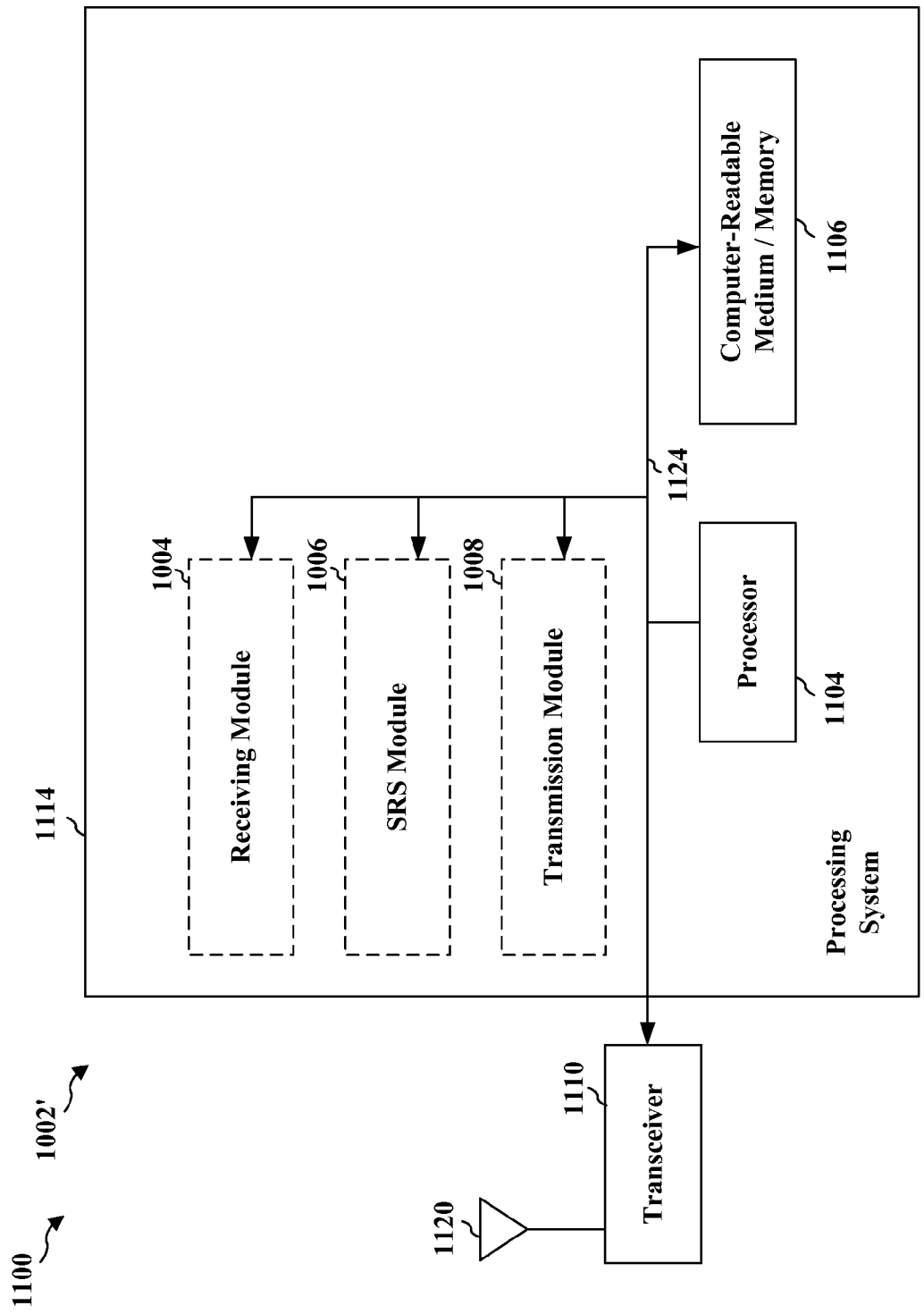
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114. In addition, the transceiver 1110 receives information from the processing system 1114, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008. The modules may be software modules running in the processor 1104, resident/stored in the computer readable medium/memory 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication may be a UE. The UE includes means for receiving a request to transmit SRS with at least one fixed/predetermined transmit power, and means for transmitting the SRS at the at least one fixed/predetermined transmit power based on the request. The UE may further include means for receiving a configuration indicating the at least one fixed/predetermined transmit power from a node. The UE may further include means for receiving a configuration indicating at least one of a frequency hop size, a bandwidth, a comb, or a cyclic shift for the SRS from a node. The UE may further include means for receiving a request to transmit a second SRS without a fixed/predetermined transmit power (or with a transmit power that is based on a particular receive power), means for determining that the transmission of the second SRS would occupy the same subframe on the same carrier as the transmission of the SRS with the at least one fixed/predetermined transmit power, and means for refraining from transmitting the second SRS in said subframe in order to transmit the SRS with the at least one fixed/predetermined transmit power. The UE may further include means for transmitting a second SRS. In one configuration, the SRS with the at least one fixed/predetermined transmit power is transmitted in a first subset of subframes of a set of subframes and the second SRS are transmitted in a second subset of subframes of the set of subframes. The first subset of subframes is different than the second subset of subframes. In one configuration, the SRS with the at least one fixed/predetermined transmit power are transmitted in a first comb of an SC-FDMA symbol within a set of resource blocks and the second SRS are transmitted in a second comb of the SC-FDMA symbol within the set of resource blocks. In one configuration, the SRS with the at least one fixed/predetermined transmit power are transmitted in an SC-FDMA symbol within a first set of resource blocks and the second SRS are transmitted in the SC-FDMA symbol within a second set of resource blocks different than the first set of resource blocks.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
   receiving a request to transmit sounding reference signals (SRS) with at least one fixed transmit power, wherein the fixed transmit power is not subject to power control by the UE;
   determining a type of SRS based on the received request in order to determine a power for an SRS transmission;
   transmitting the SRS at the at least one fixed transmit power based on the request, when the SRS is determined to be a fixed power type SRS;
   receiving a request to transmit a second SRS, wherein a transmit power of the second SRS is subject to power control by the UE;
   determining a type of the second SRS;
   determining a transmit power for the second SRS using a power control algorithm, when the SRS is determined to be a type subject to power control; and
   transmitting the second SRS using the determined transmit power.

2. The method of claim 1, wherein the at least one fixed transmit power is one fixed transmit power at a maximum power.

3. The method of claim 1, further comprising receiving a configuration indicating the at least one fixed transmit power from a node.

4. The method of claim 1, wherein the request to transmit the SRS is received from a first node, and wherein the at least one fixed transmit power enables proximity detection between the UE and a second node.

5. The method of claim 1, wherein at least one of a frequency hop size, a bandwidth, a comb, or a cyclic shift of the SRS is fixed.

6. The method of claim 1, further comprising receiving a configuration indicating at least one of a frequency hop size, a bandwidth, a comb, or a cyclic shift for the SRS from a node.

7. The method of claim 1, wherein the request is for a periodic SRS transmission, wherein the SRS are transmitted at the at least one fixed transmit power periodically based on the request for the periodic SRS transmission.

8. The method of claim 7, further comprising:
   determining that the transmission of the second SRS would occupy a same subframe on a same carrier as the transmission of the SRS with the at least one fixed transmit power; and
   refraining from transmitting the second SRS in said subframe in order to transmit the SRS with the at least one fixed transmit power.

9. The method of claim 1, wherein the request is for an aperiodic SRS transmission through a control channel, wherein the SRS are transmitted at the at least one fixed transmit power based on the request for the aperiodic SRS transmission in the control channel.

10. The method of claim 1, wherein the SRS with the at least one fixed transmit power is transmitted in a first subset of subframes of a set of subframes and the second SRS are transmitted in a second subset of subframes of the set of subframes, the first subset of subframes being different than the second subset of subframes.

11. The method of claim 1, wherein the SRS with the at least one fixed transmit power are transmitted in a first comb of a symbol within a set of resource blocks and the second SRS are transmitted in a second comb of the symbol within the set of resource blocks.

12. The method of claim 1, wherein the SRS with the at least one fixed transmit power are transmitted in a symbol within a first set of resource blocks and the second SRS are transmitted in the symbol within a second set of resource blocks different than the first set of resource blocks.

13. The method of claim 1, wherein the SRS are transmitted with a UE-specific sequence unique to the UE.

14. The method of claim 1, where the UE is associated with a UE group and the SRS are transmitted with a group-specific sequence unique to the UE group.

15. The method of claim 1, where the request includes a request to transmit the first SRS at a fixed power offset from a defined transmit power, and the defined transmit power being a maximum transmit power or a transmit power known to both the UE and a node.

16. An apparatus for wireless communication, the apparatus being a user equipment (UE), comprising:
   a memory; and
   at least one processor coupled to the memory and configured to:
      receive a request to transmit sounding reference signals (SRS) with at least one fixed transmit power, wherein the fixed transmit power is not subject to power control by the UE;
      determine a type of SRS based on the received request in order to determine a power for an SRS transmission;
      transmit the SRS at the at least one fixed transmit power based on the request, when the SRS is determined to be a fixed power type SRS;
      receive a request to transmit a second SRS, wherein a transmit power of the second SRS is subject to power control by the UE;
      determine a type of the second SRS;
      determine a transmit power for the second SRS using a power control algorithm, when the SRS is determined to be a type subject to power control; and
      transmit the second SRS using the determined transmit power.

17. The apparatus of claim 16, wherein the at least one fixed transmit power is one fixed transmit power at a maximum power.

18. The apparatus of claim 16, wherein the at least one processor is configured to receive a configuration indicating the at least one fixed transmit power from a node.

19. The apparatus of claim 16, wherein the request to transmit the SRS is received from a first node, and wherein the at least one fixed transmit power enables proximity detection between the UE and a second node.

20. The apparatus of claim 16, wherein at least one of a frequency hop size, a bandwidth, a comb, or a cyclic shift of the SRS is fixed.

21. The apparatus of claim 16, wherein the at least one processor is configured to receive a configuration indicating at least one of a frequency hop size, a bandwidth, a comb, or a cyclic shift for the SRS from a node.

22. The apparatus of claim 16, wherein the request is for a periodic SRS transmission, and the SRS are transmitted at the at least one fixed transmit power periodically based on the request for the periodic SRS transmission.

23. The apparatus of claim 22, wherein the at least one processor is configured to:

determine that the transmission of the second SRS would occupy a same subframe on a same carrier as the transmission of the SRS with the at least one fixed transmit power; and refrain from transmitting the second SRS in said subframe in order to transmit the SRS with the at least one fixed transmit power.

24. The apparatus of claim 16, wherein the request is for an aperiodic SRS transmission through a control channel, and the SRS are transmitted at the at least one fixed transmit power based on the request for the aperiodic SRS transmission in the control channel.

25. The apparatus of claim 16, wherein the SRS with the at least one fixed transmit power is transmitted in a first subset of subframes of a set of subframes and the second SRS are transmitted in a second subset of subframes of the set of subframes, the first subset of subframes being different than the second subset of subframes.

26. The apparatus of claim 16, wherein the SRS with the at least one fixed transmit power are transmitted in a first comb of a symbol within a set of resource blocks and the second SRS are transmitted in a second comb of the symbol within the set of resource blocks.

27. The apparatus of claim 16, wherein the SRS with the at least one fixed transmit power are transmitted in a symbol within a first set of resource blocks and the second SRS are transmitted in the symbol within a second set of resource blocks different than the first set of resource blocks.

28. The apparatus of claim 16, wherein the SRS are transmitted with a UE-specific sequence unique to the UE.

29. An apparatus for wireless communication, the apparatus being a user equipment (UE), comprising:

means for receiving a request to transmit sounding reference signals (SRS) with at least one fixed transmit power, wherein the fixed transmit power is not subject to power control by the UE;

means for determining a type of SRS based on the received request in order to determine a power for an SRS transmission;

means for transmitting the SRS at the at least one fixed transmit power based on the request, when the SRS is determined to be a fixed power type SRS; and means for determining a transmit power for the second SRS using a power control algorithm, when the means for receiving receive a request to transmit a second SRS, wherein a transmit power of the second SRS is subject to power control by the UE and the means for determining determine a type of the second SRS is a type subject to power control, wherein the means for transmitting transmit the second SRS using the determined transmit power.

30. A non-transitory computer-readable medium for a user equipment (UE) comprising code to:

receive a request to transmit sounding reference signals (SRS) with at least one fixed transmit power, wherein the fixed transmit power is not subject to power control by the UE;

determining a type of SRS based on the received request in order to determine a power for an SRS transmission;

transmit the SRS at the at least one fixed transmit power based on the request, when the SRS is determined to be a fixed power type SRS;

receive a request to transmit a second SRS, wherein a transmit power of the second SRS is subject to power control by the UE;

determine a type of the second SRS;

determine a transmit power for the second SRS using a power control algorithm, when the SRS is determined to be a type subject to power control; and transmit the second SRS using the determined transmit power.

31. The method of claim 1, wherein the UE comprises a predetermined configuration of at least one fixed transmit power at which fixed power type SRSs should be transmitted.

* * * * *